L. S. LACHMAN.
WHEEL.
APPLICATION FILED FEB. 8, 1918.
1,317,198.
Patented Sept. 30, 1919.
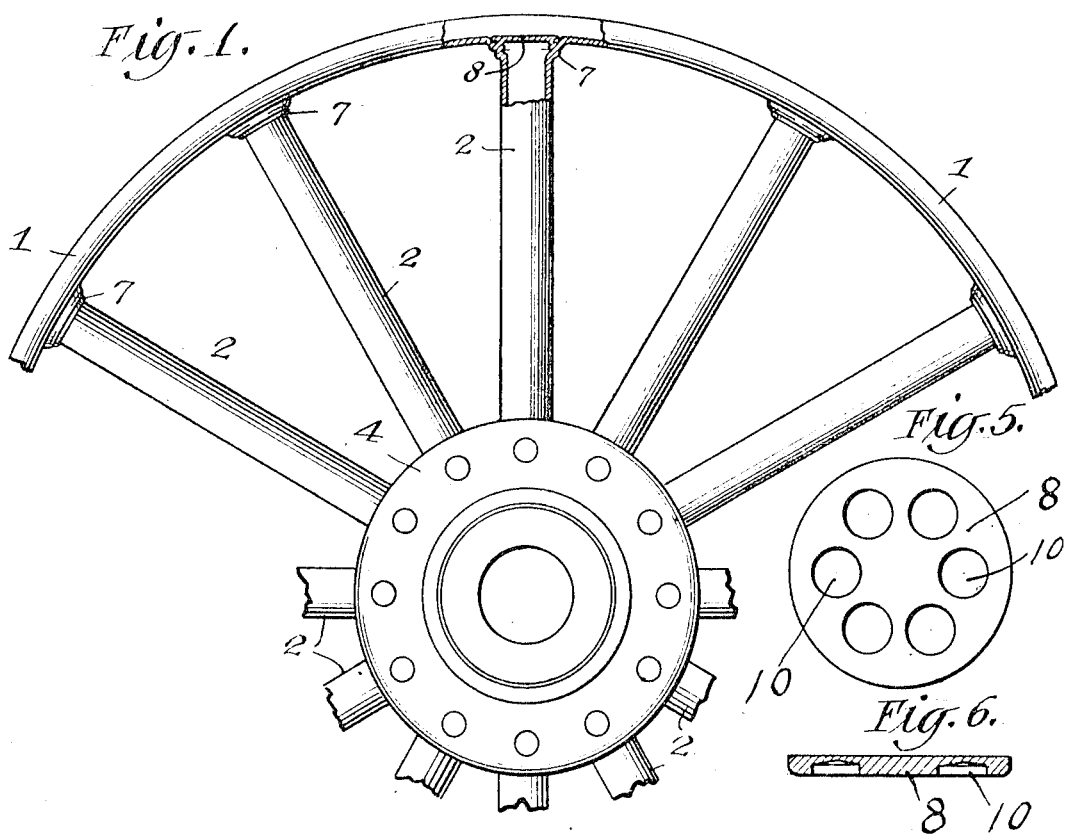
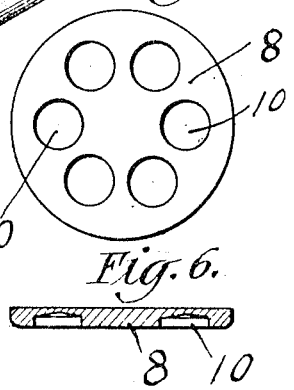
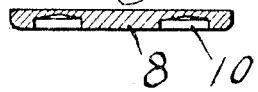
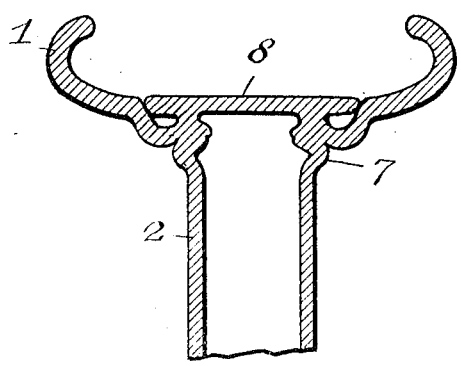
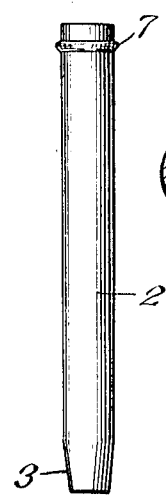
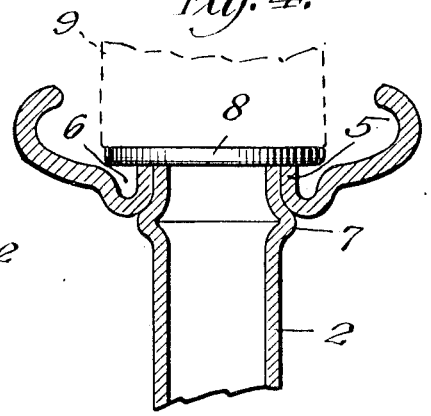
INVENTOR
Laurence S. Lachman
BY
ATTORNEYS

UNITED STATES PATENT OFFICE.

LAURENCE S. LACHMAN, OF NEW YORK, N. Y., ASSIGNOR TO STRUCTURAL PRESSED STEEL WHEEL COMPANY INC., OF NEW YORK, N. Y., A CORPORATION OF NEW YORK.

WHEEL.

1,317,198. Specification of Letters Patent. Patented Sept. 30, 1919.

Application filed February 8, 1918. Serial No. 215,978.

*To all whom it may concern:*

Be it known that I, LAURENCE S. LACHMAN, a citizen of the United States, and a resident of New York, in the county of New York and State of New York, have invented certain new and useful Improvements in Wheels, of which the following is a specification.

My invention relates to the construction of metal wheels having metal spokes and a metal rim or felly with which the spoke ends are joined.

The object of my invention is to produce a wheel of this general character with a maximum of strength and at a minimum cost, to which end my invention consists in the construction of wheels hereinafter described and claimed and embodying tubular spokes seated in perforations in the rim and held in place therein by a consolidated or homogeneous welded union formed between the end of the tubular spoke, the flange of a flanged opening in which the spoke is seated and preferably also a uniting metal plate, all as hereinafter more particularly set forth and claimed.

In the accompanying drawings:

Figure 1 is a general side elevation of a wheel embodying my invention with portions thereof at one of the spoke ends shown in section.

Fig. 2 is an enlarged vertical section of a spoke end and adjacent portion of a rim.

Fig. 3 shows in detail one of the spokes.

Fig. 4 shows the parts assembled preparatory to the formation of the union between the spoke end and the rim or felly.

Figs. 5 and 6 are underneath plan view and transverse cross-section respectively of the preferred form of welding plate employed in this invention.

1 indicates a metal rim which, as shown, may be of the usual form adapted to hold a pneumatic tire or shoe and 2 indicates the spoke which is formed of a metal tube, as shown, which, at its inner end next to the hub may be suitably constricted or tapered as illustrated at 3 to permit it to be readily clamped between hub plates one of which is indicated at 4 in Fig. 1. The method of uniting the inner ends of the spokes to the hub may be that used in the ordinary artillery type of wheel or may be any other desired union. This portion of the construction forms no part of my present invention and therefore is not more particularly described or shown.

At their outer ends the spokes are seated in tubular openings formed in the rim, each such opening being provided with a flange 5 as indicated in Fig. 4 which rises from an annular countersink or depression 6 formed in the rim in a stamp or press in any suitable way. The spoke itself is preferably formed likewise with an annular swell or rib 7 which may be formed in any desired way, as for instance by an electrical forging or upsetting operation carried on by electrically heating the section of tube at the point 7 and subjecting it to pressure in the axial direction of the tube to produce the outward swell. Said rib seats against the inner periphery of the rim to aid in the formation of a firm joint or connection between the spoke end and rim.

8 indicates a welding or uniting plate with which the flange 5 and the end of the tubular spoke 2 are preferably united in a welded homogeneous joint of the general form indicated in Fig. 2. The welding of the parts into a homogeneous welded joint such as indicated in Fig. 2 may be effected by any desired welding process. For illustration it may be assumed that the operation of welding is by a process involving pressure applied endwise or in the direction of the axis of the tube exerted upon said tube and plate 8 after the parts have been softened to the proper welding temperature, which may be conveniently effected by passing a heavy heating electric current by means of an electrode indicated in dotted lines at 9, a suitable holder or electrode for the tube itself being at the same time employed so that the current will pass from one electrode to the other through the parts to be united.

In this operation pressure may be applied by means of the electrode 9 to consolidate and weld the parts into substantially the form shown in Fig. 2. By this, as will be seen, the welding plate 8 becomes seated in the countersink or depression formed in the rim so that the outer periphery of the rim is practically uniform, that is to say, has the welded plate 8 located below or flush with the general circumferential periphery of said rim, thereby affording no projection which would tend to injure a pneumatic or other tire or shoe applied to said rim.

As will be seen, the union produced will be of great strength and by employing the welding process as above indicated, the wheel may be very cheaply produced.

The welding plate 8 is by preference provided with a plurality of counterbores 10 disposed in the under surface thereof as shown in Figs. 5 and 6. The counterbores 10 are annularly arranged so as to span the end of the tube 2 and the edge of the flange 5 and assist in securing the necessary temperature rise in the parts for the electric welding process. By this arrangement the parts may be quickly brought up to the welding heat and yet a smooth outer surface of the plate where it is engaged by the inner tube used in the rim will be maintained. I do not however limit myself to this form of welding plate as other ways of forming the plate to secure quick temperature rise in the parts may be employed or a plate having uniform thickness and continuous surfaces may be employed.

What I claim as my invention is:—

1. A metal wheel having tubular spokes united with a metal rim by a homogeneous welded joint formed between the end of the spokes, the flange of a flanged opening in the rim and a welding plate engaged with said flange and the end of the tubular spoke.

2. A metal wheel having tubular spoke and rim united by a welding plate welded to the spoke and flange around an opening in the rim in which the spoke is seated, said welded plate being located in a countersink in the rim formed around the flange.

3. A metal wheel comprising a metal rim and tubular spokes, said spokes being provided with annular swells or enlargements engaging with the rim and being united at their ends with a flange surrounding an opening in which the spoke end is seated and with a welding plate united with said flange and spoke end and itself seated in a countersink or depression formed in the outer periphery of the rim.

4. A metal wheel comprising tubular spokes and a metal rim, said metal rim being provided with perforations to receive the tube ends and with annular flanges extending radially outward from the edge of an annular depression in the rim, said flanges and tube ends being welded together and a plate superposed over the end of each spoke tube and flush with the outer surface of the rim.

Signed at New York, in the county of New York and State of New York, this 7th day of February, A. D. 1918.

LAURENCE S. LACHMAN.

Witnesses:
   F. B. TOWNSEND,
   IRENE LEFKOWITZ.